US008474558B2

(12) United States Patent
Ohira et al.

(10) Patent No.: US 8,474,558 B2
(45) Date of Patent: Jul. 2, 2013

(54) ENGINE INTAKE PASSAGE STRUCTURE OF FRONT VEHICLE BODY

(75) Inventors: Takahide Ohira, Hiroshima (JP); Seiji Gono, Hiroshima (JP); Dai Yoshimura, Hiroshima (JP); Yukari Urata, Hiroshima (JP)

(73) Assignee: Mazda Motor Corporation (JP)

( * ) Notice: Subject to any disclaimer, the term of this patent is extended or adjusted under 35 U.S.C. 154(b) by 893 days.

(21) Appl. No.: 12/504,359

(22) Filed: Jul. 16, 2009

(65) Prior Publication Data

US 2010/0032220 A1 Feb. 11, 2010

(30) Foreign Application Priority Data

Aug. 7, 2008 (JP) ................................ 2008-204070

(51) Int. Cl.
*B60K 13/02* (2006.01)

(52) U.S. Cl.
USPC .......................................... 180/68.3; 293/117

(58) Field of Classification Search
USPC ........................ 180/68.3, 68.1, 68.2; 293/117
See application file for complete search history.

(56) References Cited

U.S. PATENT DOCUMENTS 4,420,057 A * 12/1983 Omote et al. ................ 180/68.3
4,533,012 A * 8/1985 Komoda ...................... 180/68.3
4,653,788 A * 3/1987 Di Giusto ..................... 293/117
4,902,059 A * 2/1990 Tritton .......................... 293/117
4,932,490 A * 6/1990 Dewey ......................... 180/68.3
5,022,479 A * 6/1991 Kiser et al. .................... 180/68.3
5,042,603 A * 8/1991 Olson .......................... 180/68.3
5,054,567 A * 10/1991 Hoffman ...................... 180/68.2
5,141,068 A * 8/1992 Mendicino ................... 180/68.3
5,251,712 A * 10/1993 Hayashi et al. .............. 180/68.3
5,618,323 A * 4/1997 Shearn et al. ................ 55/385.3
5,660,243 A * 8/1997 Anzalone et al. ............ 180/68.1
5,860,685 A * 1/1999 Horney et al. ................ 293/113
6,302,228 B1 * 10/2001 Cottereau et al. ............ 180/68.1
6,880,655 B2 * 4/2005 Suwa et al. .................. 180/68.1
6,945,576 B1 * 9/2005 Arentzen ...................... 293/117
6,966,293 B1 11/2005 Patillo
7,234,555 B2 * 6/2007 Khouw et al. ............... 180/68.3
7,717,204 B2 * 5/2010 Kondou et al. .............. 180/68.1
8,011,465 B2 * 9/2011 Yingling et al. ............. 180/68.3
8,100,209 B2 * 1/2012 Goldsberry .................. 180/68.1

(Continued)

FOREIGN PATENT DOCUMENTS

DE 10 2007 015 863 A1 10/2008
EP 0 051 122 A2 5/1982

(Continued)

OTHER PUBLICATIONS

Extended European Search Report dated Apr. 13, 2010; Application No./ Patent No. 09010006.6-2311 / 2169210.

*Primary Examiner* — Jeffrey J Restifo
(74) *Attorney, Agent, or Firm* — Studebaker & Brackett PC

(57) ABSTRACT

There is provided a duct, an inlet portion of which is disposed so as to be exposed to an upper-side portion of an air intake opening and an outlet portion of which connects to an inlet of an intake passage of an engine. There can be provided an engine intake passage structure of a front vehicle body which can properly reduce a risk of the water coming into the inlet of the intake passage of the engine even when the vehicle travels on the flooded road.

9 Claims, 12 Drawing Sheets

U.S. PATENT DOCUMENTS

| | | | | |
|---|---|---|---|---|
| 8,127,878 | B2 * | 3/2012 | Teraguchi et al. | 180/68.3 |
| 8,157,040 | B2 * | 4/2012 | Khouw et al. | 180/68.3 |
| 8,201,651 | B2 * | 6/2012 | Salvesen et al. | 180/68.3 |
| 8,215,433 | B2 * | 7/2012 | Khouw et al. | 180/68.3 |
| 2003/0042055 | A1 * | 3/2003 | Suwa et al. | 180/68.3 |
| 2010/0032220 | A1 * | 2/2010 | Ohira et al. | 180/68.3 |
| 2012/0048632 | A1 * | 3/2012 | Mehlos et al. | 180/68.3 |
| 2012/0111653 | A1 * | 5/2012 | Stuckey | 180/68.3 |

FOREIGN PATENT DOCUMENTS

| | | | |
|---|---|---|---|
| EP | 1 637 726 | A1 | 3/2006 |
| EP | 1 745 968 | A2 | 1/2007 |
| JP | H3-54080 | A | 3/1991 |
| JP | H5-34019 | U | 5/1993 |
| JP | 2004-114984 | A | 4/2004 |
| JP | 2005-343244 | A | 12/2005 |
| JP | 2006-327371 | A | 12/2006 |

* cited by examiner

ENGINE INTAKE PASSAGE STRUCTURE OF FRONT VEHICLE BODY

BACKGROUND OF THE INVENTION

The present invention relates to an engine intake passage structure of a front vehicle body in which outside air introduced through an air intake opening formed at a bumper fascia is guided to an inlet portion of an intake passage of an engine which is disposed above a heat exchanger.

In general, a heat exchanger (radiator) to cool a cooling water of an engine is disposed at a front portion of a vehicle body of an automotive vehicle. Further, an air intake opening to introduce outside air for cooling the heat exchanger therein is formed at a specified portion of a bumper fascia which forms an outer face of the front portion of the vehicle body, the specified portion facing to the heat exchanger.

Herein, there may be a case in which the inlet portion of the intake passage of the engine is disposed above the heat exchanger, and part of the outside air introduced through the air intake opening is guided to the inlet portion of the engine intake passage via a space behind the bumper fascia. In this case, there is a concern that the rainwater contained in the outside air coming in through the air intake opening on a rainy day would reach the inlet portion of the engine intake passage, resulting in causing some damage to the engine.

Japanese Patent Laid-Open Publication No. 2005-343244 discloses an example which may cope with this concern. That is, according to this example, there is provided a rainwater preventing member (an air guide member) which has a plurality of slits between an air intake opening and an inlet of an intake passage of an engine. The rainwater may be prevented from coming in by this preventing member.

Herein, in case a road is flooded, an automotive vehicle traveling on the road may have the following problem even if the inlet of the engine intake passage is disposed above a heat exchanger. That is, when the automotive vehicle travels on the flooded road, as shown in FIG. 15, the water may possibly come in a vehicle body through the air intake opening formed at the bumper fascia. Herein, the heat exchanger disposed behind the air intake opening may become an obstacle (wall) against the water coming in, so the water in front of the heat exchanger may rise up to the height of the inlet of the engine intake passage in a space between the bumper fascia and the heat exchanger. Consequently, the rising water may come into the inlet of the intake passage, resulting in causing the damage to the engine.

SUMMARY OF THE INVENTION

Accordingly, an object of the present invention is to provide an engine intake passage structure of a front vehicle body which can properly reduce a risk of the water coming into the inlet of the intake passage of the engine even when the vehicle travels on the flooded road.

According to the present invention, there is provided an engine intake passage structure of a front vehicle body, comprising an intake passage of an engine, an inlet of which is disposed above a heat exchanger which is provided at a front portion of a vehicle body, an air intake opening to introduce outside air therein, the air intake opening being formed at a specified portion of a bumper fascia which forms an outer face of the front portion of the vehicle body, the specified portion facing to the heat exchanger, and a duct to guide the outside air, an inlet portion of which is disposed so as to be exposed to an upper-side portion of the air intake opening and an outlet portion of which connects to the inlet of the intake passage of the engine.

According to the present invention, part of the air coming in through the air intake opening at the bumper fascia is guided to the inlet of the intake passage of the engine via the duct which has the inlet portion which is disposed so as to be exposed to the upper-side portion of the air intake opening and the outlet portion which connects to the inlet of the intake passage of the engine. Thereby, even if the water coming in the vehicle front body through the air intake opening rises up to the height of the inlet of the engine intake passage in the space behind the inlet portion of the duct and before the heat exchanger, the water can be prevented from coming into the duct as long as the water height on the flooded road is lower than that of the inlet portion of the duct. Thus, the risk of the water coming into the inlet of the intake passage of the engine, which may cause some damage to the engine, can be reduced properly.

According to an embodiment of the present invention, the air intake opening is formed so as to extend outward in a vehicle width direction beyond the heat exchanger in an elevation view of a vehicle, and the inlet portion of the duct is disposed so as to be exposed to a portion of the air intake opening which is positioned outside of the heat exchanger. Thereby, the inlet portion of the duct does not exist in front of the heat exchanger. Accordingly, even if the inlet portion of the duct is disposed so as to be exposed to the air intake opening, the air introduction toward the heat exchanger may not be prevented.

In the meantime, the water height on the flooded road may change, so that a case in which the water height rises up above the inlet portion of the duct temporally should be anticipated. Further, if the water comes into the duct, the amount of air supplied to the engine may be reduced. Some countermeasures against this should be necessary as well.

Thus, according to another embodiment of the present invention, the inlet portion of the duct comprises a plurality of inlets which are disposed away from each other in a vehicle width direction, and there is provided a connection portion which connects downstream portions of the plural inlets and extends in the vehicle width direction at a positioned which is above the inlets of the duct and below the inlet of the intake passage of the engine. Thereby, an enlarged space is ensured by the connection portion of the duct which extends in the vehicle width direction at a middle level between the inlet portion of the duct and the inlet of the engine intake passage. Accordingly, even in case the water comes in through the inlet portion of the duct, the duct can be properly prevented from being filled with the water. As a result, the water coming into the duct can be prevented properly from reaching the inlet of the engine intake passage, and the proper air flow to the inlet of the engine can be ensured. Moreover, since the plural inlets of the duct are provided, even when the water comes in through one of the inlets, the necessary amount of air for the engine can be effectively ensured.

According to another embodiment of the present invention, a drain portion is provided at the connection portion of the duct. Thereby, the water coming into the duct through the inlet portion is discharged from the drain portion. Accordingly, preventing the water from reaching the inlet of the engine intake duct can be improved.

According to another embodiment of the present invention, the duct includes the bumper fascia and a member which is provided so as to face to a back face of the bumper fascia. Thereby, since the duct includes the bumper fascia, the duct can be formed properly by using a member which is generally provided at the automotive vehicle. Further, since the duct includes the member which is provided so as to face to the back face of the bumper fascia, the duct can be provided along with the bumper fascia having its increased rigidity.

Other features, aspects, and advantages of the present invention will become apparent from the following description which refers to the accompanying drawings.

DETAILED DESCRIPTION OF THE INVENTION

Hereinafter, front portion structures of an automotive vehicle according to preferred embodiments of the present invention will be described.

Embodiment 1

Figure 1:
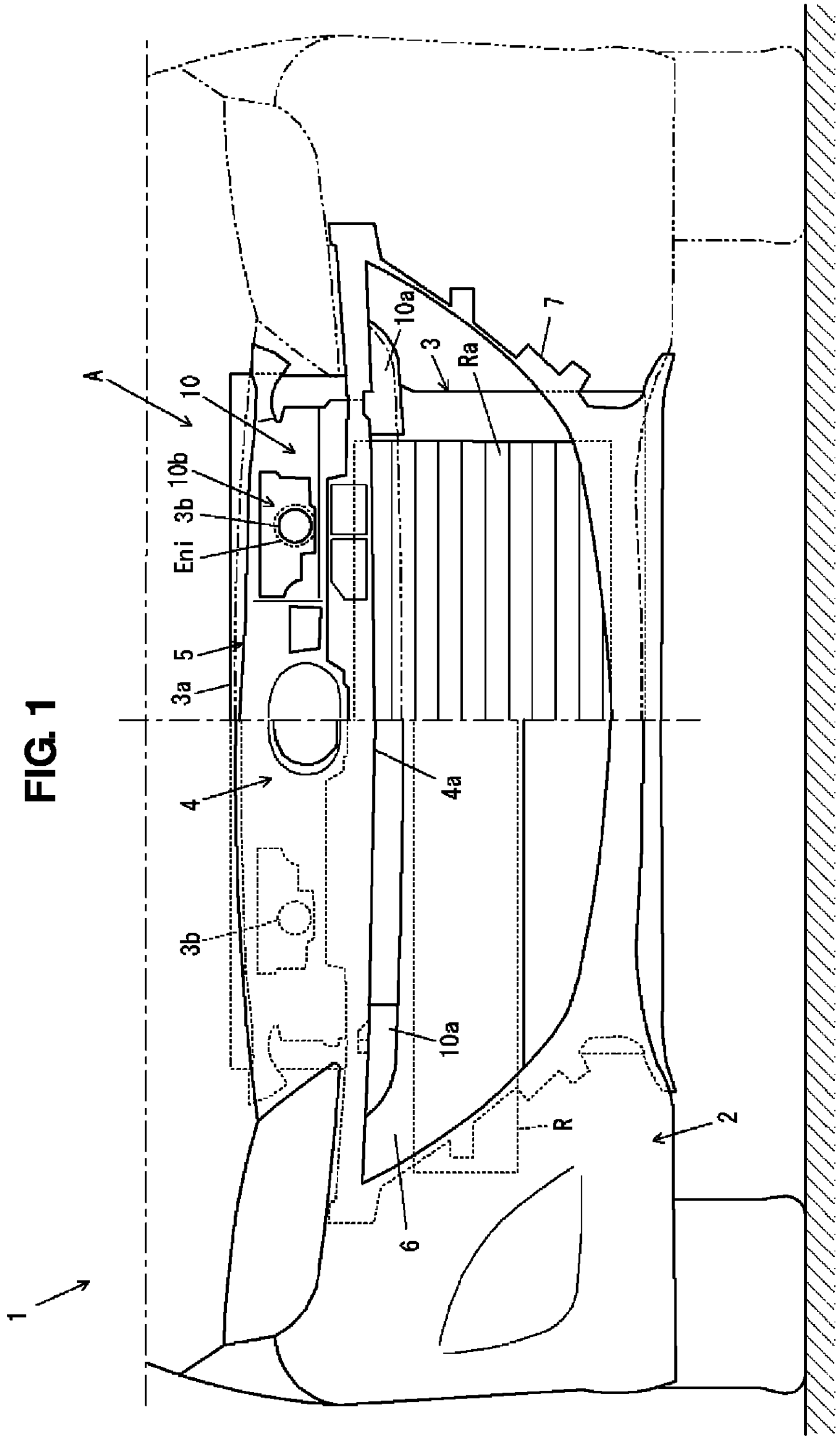
FIG. 1 is an elevation view of a front portion of an automotive vehicle according to a first embodiment of the present invention.

As shown in FIG. 1, a bumper 2 is provided at a front end portion of an automotive vehicle 1 according to the present embodiment. An engine room where an engine is disposed is provided behind a bumper 2, and a radiator Ra to cool a cooling water of the engine is provided at a front portion of the engine room. The radiator Ra is fixed to a vehicle body via a rectangular shroud member 3. An inlet Eni of an intake passage En of the engine is provided above and in back of the radiator Ra.

The bumper 2 comprises a bumper fascia 4 which forms a design face of the front end portion of the vehicle body and a bumper-fascia support member 5 which is provided so as to face to a back face of the bumper fascia 4 and attached to an upper portion 3*a* of the shroud member 3 to support the bumper fascia 4 from behind.

An air intake opening 4*a* which introduces outside air therein is formed at a specified portion of the bumper fascia 4 which faces to the heat exchanger Ra. The air intake opening 4*a* is formed so as to extend outward in a vehicle width direction beyond the heat exchanger Ra in an elevation view of the vehicle.

At the air intake opening 4*a* is provided a grill member 6 which decorates this opening 4*a* (covers a bumper reinforcement R which extends in the vehicle width direction behind the opening 4*a*). Further, at the air intake opening 4*a* of the bumper fascia 4 is provided a rectangular grill support member 7 to attach the grill member 6 to the bumper-fascia support member 5. The grill support member 7 has substantially the same shape as the above-described air intake opening 4*a*. Herein, the air intake opening 4*a* is divided by the grill member 6 into two parts; an upper part (a portion between an upper edge portion of the opening 4*a* and an upper edge portion of the grill member 6) and a lower part (a portion between a lower edge portion of the opening 4*a* and a lower edge portion of the grill member 6). Herein, these will be referred to as an "upper-side portion" and a "lower-side portion" of the air intake opening 4*a* at need.

The bumper-fascia support member 5 has substantially the same width and height as the upper portion 3*a* of the shroud member 3, and this member 5 is attached to the upper portion 3*a* of the shroud 3 and the like.

The shroud member 3, which is made from resin, is fixed to a vehicle-body structure member, such as right and left side frames (not illustrated), and the upper portion 3*a* of the member 3 has opening portions 3*b*, 3*b* to penetrate right and left end portions thereof. The left-side opening portion 3*b* guides the air which has been introduced from the upper-side portion of the air intake opening 4*a* of the bumper fascia 4 to a portion of the engine room behind the shroud member 3. The right-side opening portion 3*b* guides the air which has been introduced from the upper-side portion of the air intake opening 4*a* of the bumper fascia 4 to the inlet Eni of the engine intake passage En. Behind the right-side opening portion 3*b* is provided a cylindrical connection flange portion 3*e* which extends rearward, and the inlet Eni of the engine intake passage En is connected to the flange portion 3*e* (see FIG. 5).

Herein, according to the present embodiment, the duct 10 which guides the air, which has been introduced from the upper-side portion of the air intake opening 4*a* of the bumper fascia 4, to the portion of the engine room behind the shroud member 3 and the inlet Eni of the engine intake passage En respectively is comprised of the bumper fascia 4, bumper-fascia support member 5, and shroud member 3.

Figure 2:
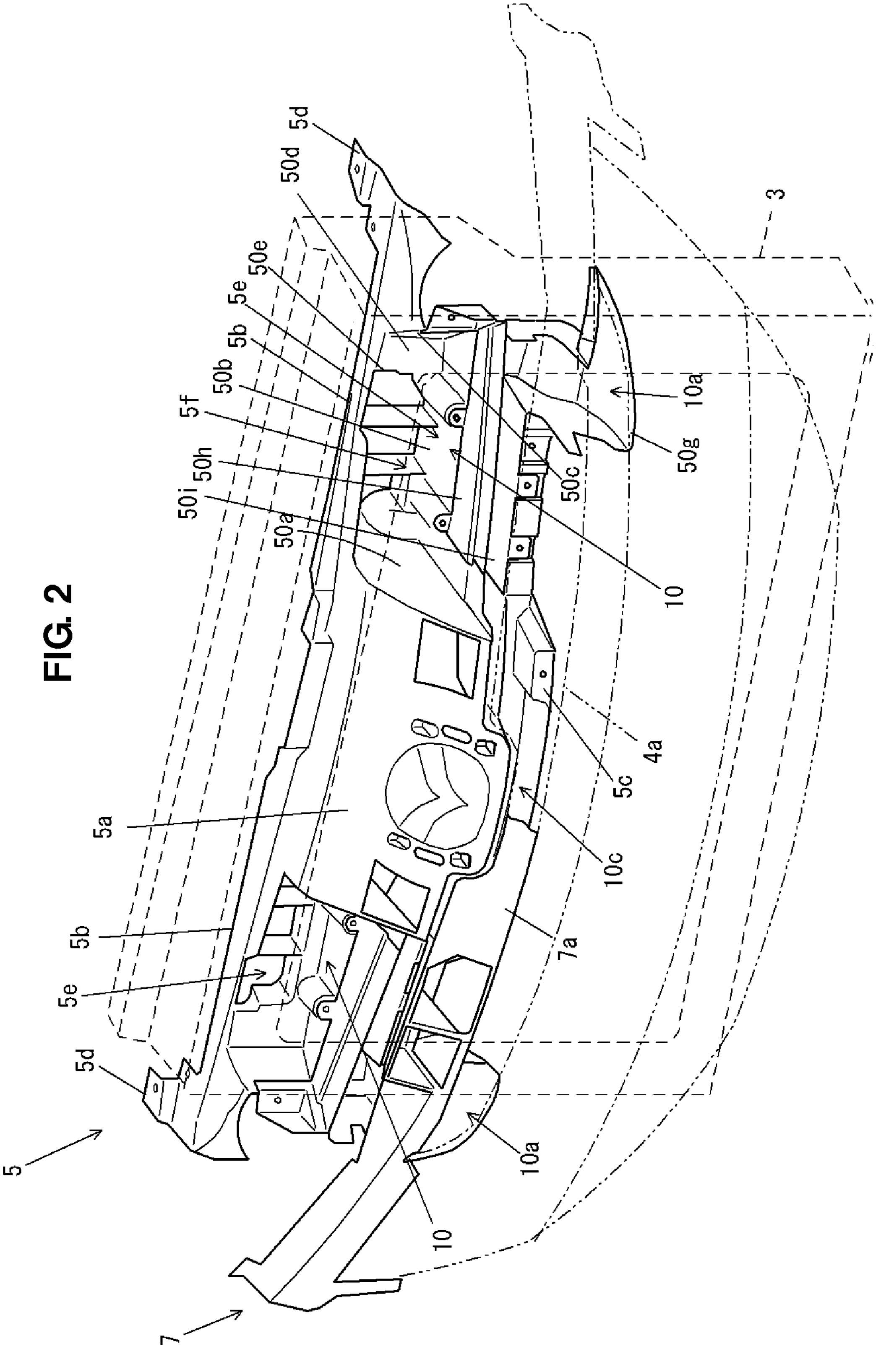
FIG. 2 is a perspective view of a bumper fascia support member (herein, a left half of the figure shows a state in which a grill support member is attached).

Hereinafter, the structure of these members constituting the duct 10 will be described specifically. The bumper-fascia support member 5, as shown in FIG. 2, comprises a fascia-central-portion support face portion 5*a*, fascia-upper-edge-portion support portions 5*b*, 5*b*, grill fixing portions 5*c*, 5*c*, support-member fixing portions 5*d*, 5*d*, and lower duct portions 5*e*, 5*e*. Herein, the fascia-central-portion support face portion 5*a* is located at a central portion in the vehicle width direction so as to extend rearward and upward along an inner face of the bumper fascia 4. The fascia-upper-edge-portion support portions 5*b*, 5*b* extend laterally from both sides of upper rear ends of the fascia-central-portion support face portion 5*a* and support the upper edge portion of the bumper fascia 4. The grill fixing portions 5*c*, 5*c* are provided below the fascia-central-portion support face portion 5*a* and an upper side portion 7*a* of the grill support member 7 is fixed to this grill fixing portions 5*c*, 5*c*. The support-member fixing portions 5*d*, 5*d* extend rearward from both-side outward end portions of the fascia-upper-edge-portion support portions 5*b*, 5*b* and these portions 5*d*, 5*d* are fixed to an upper face of the upper portion 3*a* of the shroud member 3. The lower duct portions 5*e*, 5*e* are provided on both sides of the fascia-central-portion support face portion 5*a* respectively so as to form a lower portion of the duct 10. An upper portion of the duct 10 is formed by a face portion of the bumper fascia 4 which is located above the lower duct portions 5*e*, 5*e*.

Figure 3:
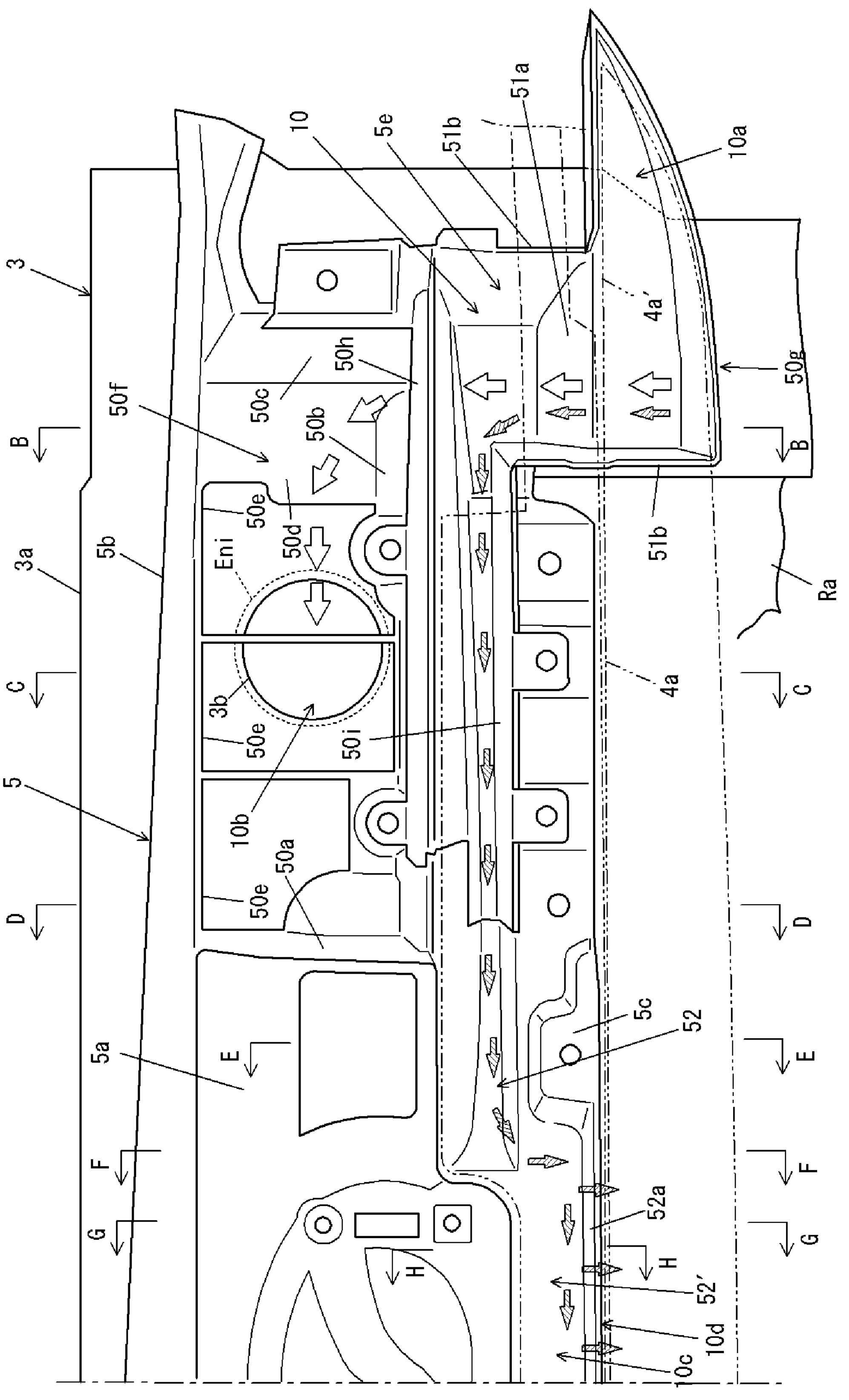
FIG. 3 is an enlarged view of a portion shown by an arrow A of FIG. 1.

The lower duct portion 5*e*, as shown in FIG. 3, comprises an inward side face portion 50*a* which is located beside the fascia-central-portion support face portion 5*a*, a bottom face portion 50*b* which extends laterally from a lower end of the inward side face portion 50*a*, an outward side face portion 50*c* which is provided between an outward end of the bottom face portion 50*b* and the fascia-upper-edge-portion support portions 5*b*, a rear face portion 50*d*, and plural outlet opening portions 50*e*, 50*e* which are formed at a specified portion of the rear face portion 50*d* which is located in front of the opening portion 3*b* of the shroud member 3. Thus, the lower duct portion 5*e* has a body portion 50*f* which is of a substantially box shape with its front side and upper side opening.

The body portion 50*f* is, as apparent from FIG. 3, positioned above the air intake opening 4*a*, and below an outward end of the body portion 50*f* is provided a gutter-shaped guide portion 50*g* which projects forward to guide the air to the body portion 50*f*.

Figure 4:
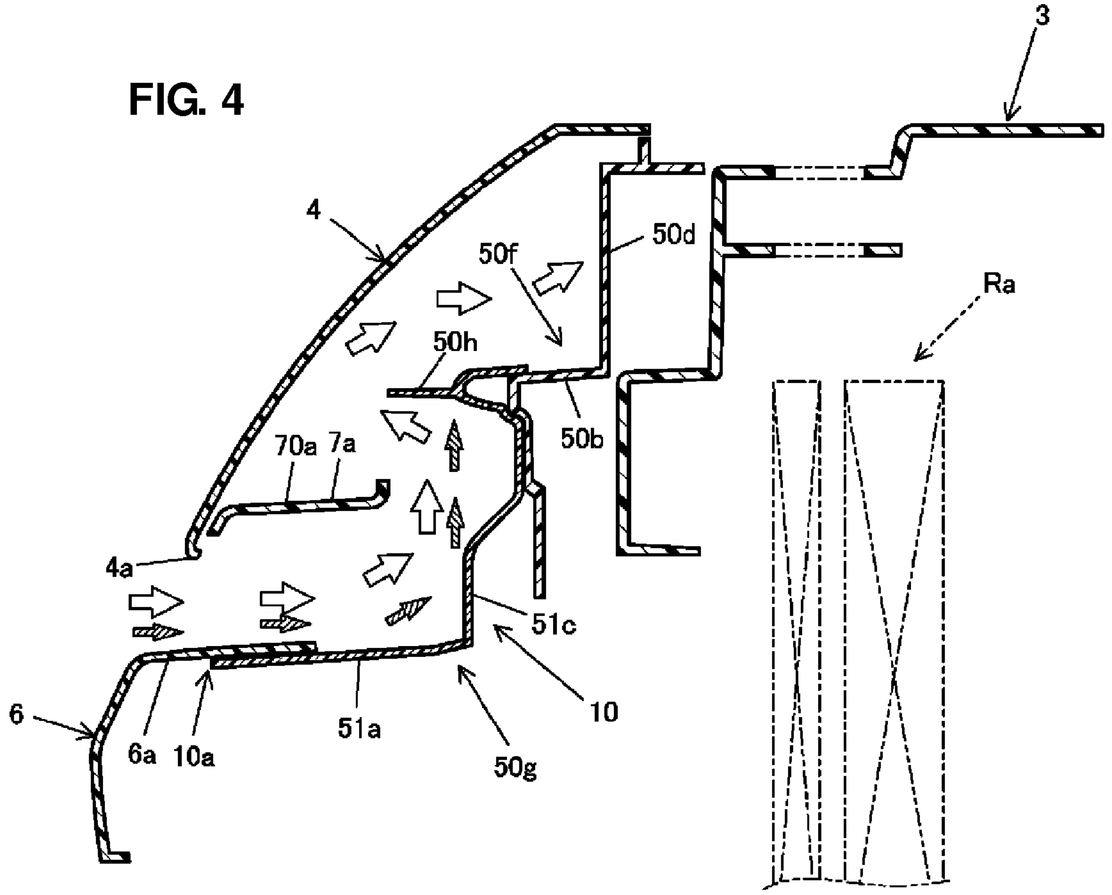
FIG. 4 is a sectional view (end face view) taken along line B-B of FIG. 3.

As shown in FIG. 4, the guide portion 50*g* comprises a bottom face portion 51*a* which is provided substantially continuously to an air-guide face portion 6*a* extending horizontally along the upper edge portion of the grill member 6, and a rear face portion 51*c* which rises from a rear end of the bottom face portion 51*a* to a position near an front end of the bottom face portion 50*b* of the body portion 50*f*. Further, as apparent from FIG. 3, at both sides of the bottom face portion 51*a* are provided side face portions 51*b*, 51*b* which rise upward to prevent the water from coming in from the side of the guide portion 50*g*.

A lower potion of the guide portion 50*g* is located at a position below the bottom face portion 50*b* so as to be exposed to a specified portion of the upper-side portion of the air intake opening 4*a* which is positioned outside of the heat exchanger Ra. Herein, the lower portion of the guide portion 50*g* constitutes an inlet portion 10*a* of the duct 10 together with an upper edge portion 4*a*' of the air intake opening 4*a* of the bumper fascia 4. Herein, as apparent from FIGS. 1, 2 and others, the bumper fascia 4 and the bumper-fascia support member 5 are formed symmetrically, so that the inlet portion 10*a* comprises two inlets which are disposed away from each other so as to be exposed to specified portions of the upper-side portion of the air intake opening 4*a* which are located at both sides of the radiator Ra.

Further, as shown in FIGS. 3 and 4, at the lower duct portion 5*e* is provided an eaves portion 50*h* which projects forward substantially horizontally from an upper end of the rear face portion 51*c* of the guide portion 50*g*. The eaves portion 50*h* traps a water portion, such as rainwater, which comes from the inlet portion 10*a* of the duct 10 via the guide portion 50*g* and makes the water portion drop therefrom, thereby preventing the water portion from coming down to the downstream of the eaves portion 50*h* (toward the inlet Eni of the engine intake passage; to the upper portion in FIGS. 3 and 4). Moreover, the eaves portion 50*h* prevents the water, which has come in from the inlet portion 10*a* of the duct 10 when the road is flooded, from flowing down to the downstream of the eaves portion 50*h* (the same as above). Herein, the eaves portion 50*h* is provided so as to extend toward the central portion of the vehicle over an almost whole width of the lower duct portion 5*e*.

Figure 5:
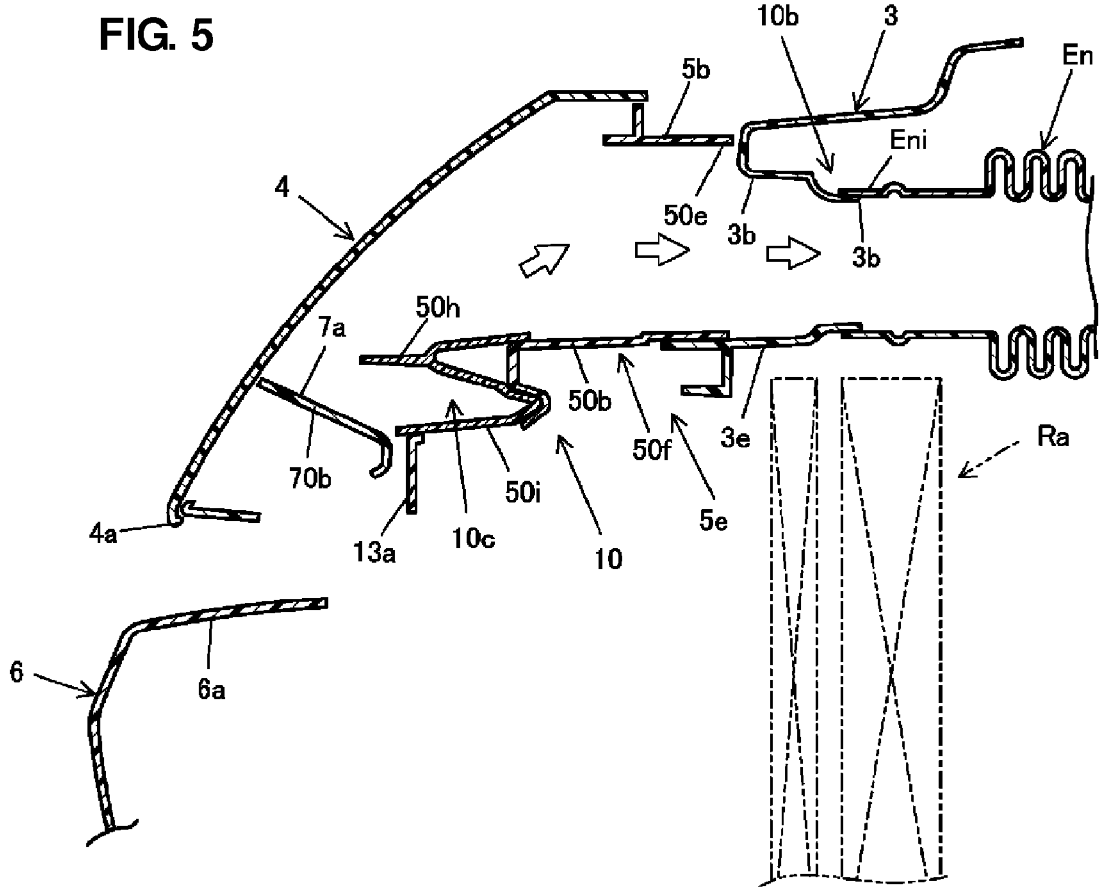
FIG. 5 is a sectional view (end face view) taken along line C-C of FIG. 3.
Figure 6:
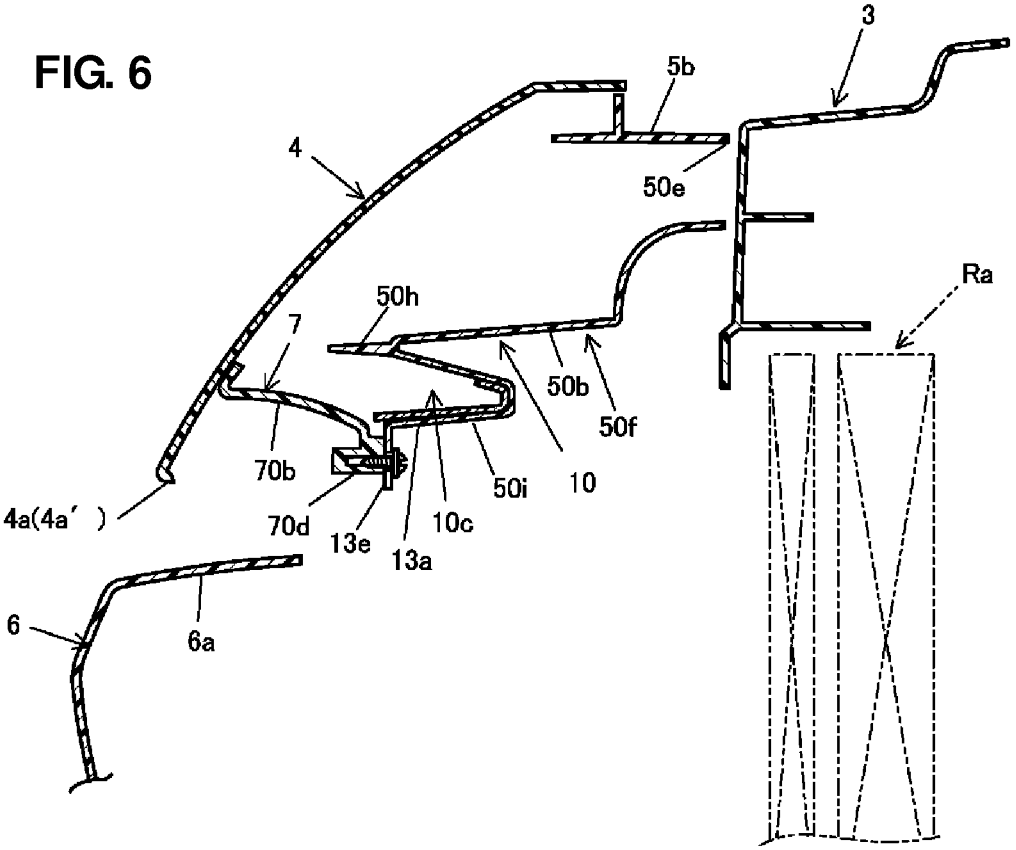
FIG. 6 is a sectional view (end face view) taken along line D-D of FIG. 3.

Further, as shown in FIGS. 3, 5 and 6, at the lower duct portion 5*e* is provided a guide portion 50*i* which projects obliquely forward and downward from a rear end portion of the eaves portion 50*h* of the guide portion 50*g*. The guide portion 50*i* is located on the central side of the guide portion 50*g* in such a manner that its central portion is positioned at a lower level so as to guide the water portion dropped from the eaves portion 50*h* and the water coming in from the inlet portion 10*a* of the duct 10 toward a drain portion 10*d* of a guide connection portion 52, which will be described below.

As apparent from FIGS. 1 and 2, the upper side portion 7*a* of the grill support member 7 extends in the vehicle width direction along the rear face of the upper edge portion of the air intake opening 4*a* of the bumper fascia 4. Further, as shown in FIG. 4, a horizontal lateral face portion 70*a* is formed above the guide portion 50*g* of the lower duct portion 50*e*. A rear end of the lateral face portion 70*a* is located at a position of the front end of the eaves portion 50*h* in the longitudinal direction, so that the air coming in from the inlet portion 10*a* of the duct 10 can be made flow surely below the eaves portion 50*h*. Consequently, the water portion, such as raindrops, which is contained in the air can be shut out (trapped) surely by the eaves portion 50*h*.

Further, as apparent from FIGS. 5 and 6, a projection wall portion 70*b* is provided at a specified portion of the upper side portion 7*a* of the grill support member 7 which is located inward from the guide portion 50*g* of the lower duct portion 5*e*. The projection wall portion 70*b* projects obliquely rearward and downward from the inner face position of the bumper fascia 4, and a tip end (rear end portion) of the projection wall portion 70*b* is located near the front end portion of the guide portion 50*i*. Thereby, a gap between the inner face of the bumper fascia 4 and the front end portion of the guide portion 50*i* is covered substantially, so that the water contained in the air which has come in from the specified portion of the air intake opening 4*a* which is located inward from the guide portion or the water supplied from below the vehicle body can be properly prevented from flowing into the space inside the duct 10.

Figure 7:
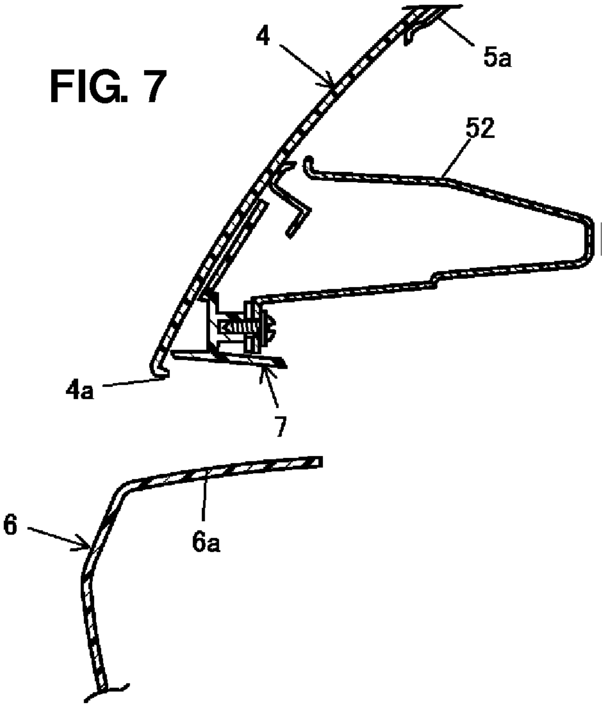
FIG. 7 is a sectional view (end face view) taken along line E-E of FIG. 3.

Moreover, as apparent from FIGS. 3 and 7, the guide connection portion 52 is provided below the fascia-central-portion support face portion 5*a* of the bumper-fascia support member 5. The guide connection portion 52 has a cross section with its front side opening so as to be continuous to the respective eaves portions 50*h*, 50*h* and guide portions 50*i*, 50*i* of the both-side lower duct portions 5*e*, 5*e*. Herein, the guide connection portion 52 and the both-side guide portions 50*i*, 50*i* extend in the vehicle width direction at a level which is higher than the inlet portions 10*a*, 10*a* of the duct 10 and lower than the inlet Eni of the intake passage En. These guide connection portion 52 and guide portions 50*i*, 50*i* correspond to a connection portion in the claims (hereinafter, referred to as a "connection portion 10*c*" at need).

A central portion 52' of the guide connection portion 52 is configured, as apparent from FIG. 3, such that its bottom face portion 52*a* is located at a lower level than that of the right and left portions of the guide connection portion 52. As apparent from FIGS. 8, 10 and 11, between a front end 52*a*' of the bottom face portion 52*a* of the central portion 52' and an upper edge portion 4*a*' (a lower end portion of the grill support member 7) of the air intake opening 4*a* of the bumper fascia 4 is provided a gap 10*d* having a specified amount of distance in the longitudinal direction (the gap 10*d* corresponds to a drain portion in the claims; hereinafter, referred to as a "drain portion 10*d*"). The water which flows to the central portion 52' of the guide connection portion 52 from the both sides is drained out of the drain portion 10*d* to the outside of the duct 10. Herein, this gap 10*d* is formed over a whole width of the central portion 52', so that the relatively large drain portion 10*d* can be made easily. The reason the bottom face portion 52*a* of the central portion 52' is located at the lower level than that of the right and left portions of the guide connection portion 52 is to prepare for a case in which the water could be collected and stored temporally even when the large amount of water flows in from the both sides at one time.

Figure 9:
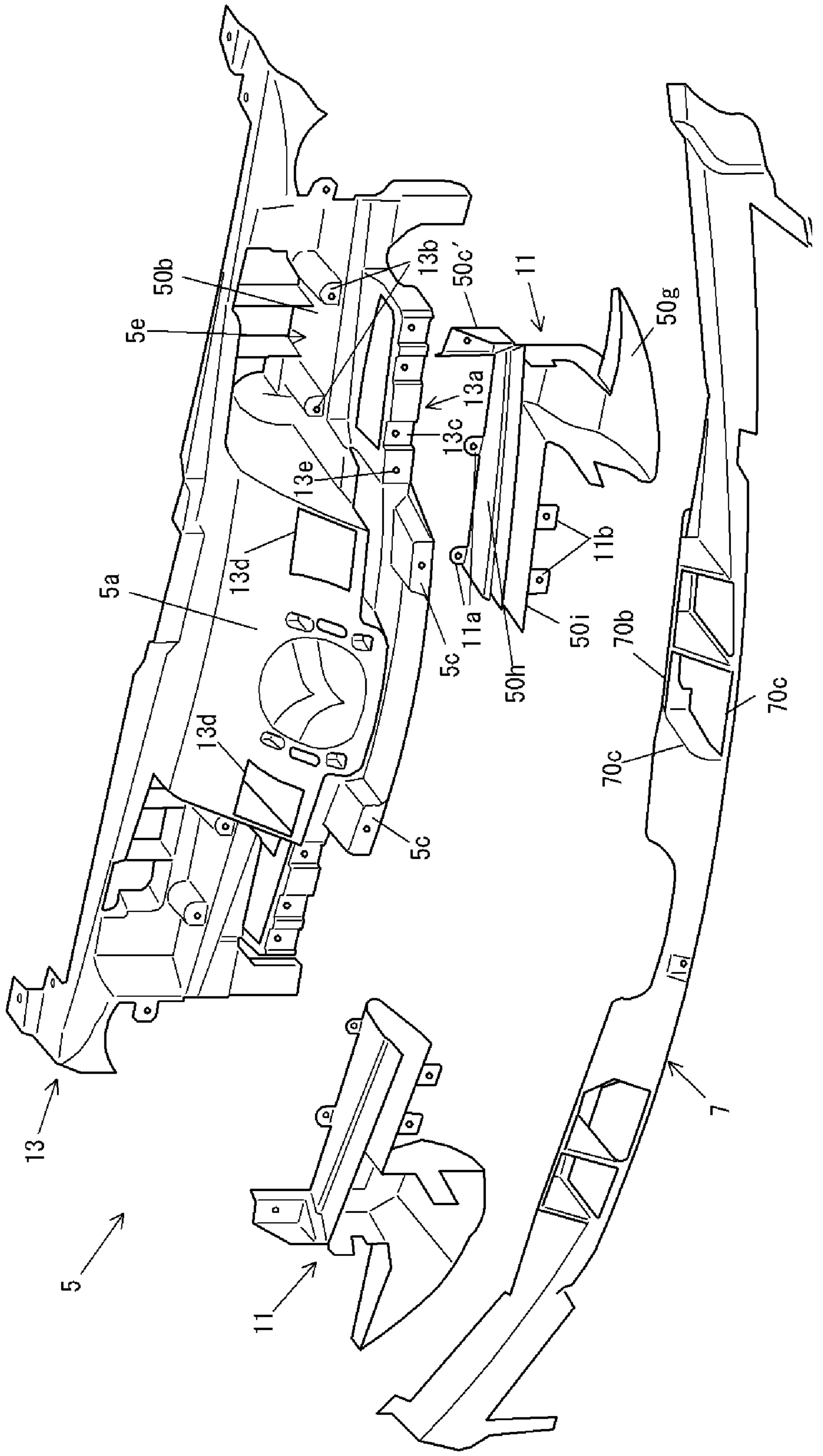
FIG. 9 is a perspective view of the bumper fascia support member and the grill support member.

The bumper-fascia support member 5 comprises, as shown in FIG. 9, lower duct front portion members 11, 11 which form a front portion of the lower duct portion 5*e*, specifically, the guide portion 50*g*, eaves portion 50*h*, guide portion 50*i* and a front potion 50*c*' of the outward side face portion 50*c*, and a body member 13 which forms other parts. Herein, FIG. 9 illustrates the grill support member 7 as well as the bumper-fascia support member 5.

These members 11, 13 are made of resin, and the lower duct front portion members 11, 11 are made of a material which has a lower rigidity than a material which the body member 13 is made of. This is to improve a shock absorption function and to prevent the shroud member 3 from being broken against the vehicle frontal collision or the like. That is, while the guide portion 50*g* of the lower duct portion 5*e* is formed so as to project forward having the bottom face portion 51*a* and the side face portions 51*b*, 51*b* and thereby the rigidity of the portion 5*g* tends to become greater, the rigidity of the portion 5*g* is effectively weakened and adjusted by the above-described low-rigidity material. Herein, elastomer, for example, may be preferably used as the low-rigidity material. Meanwhile, polypropylene, for example, may be preferably used as the material for the body member 13.

The body member 13 has openings 13*d* . . . 13*d* to reduce the rigidity if the central portion of the bumper-fascia support member 5 at lower both-side portions of the fascia support face portion 5*a*.

Next, fixing and supporting among these members 11, 13, the bumper fascia 4, and grill support member 7 will be described.

At first, the fixing between the body member 13 and the lower duct front portion members 11, 11 will be described referring to FIG. 9. A substantially rectangular frame portion 13*a* is formed at the body member 13 at a location in front of the bottom face portion 50*b* of the lower duct portion 5*e*. The guide portion 50*i* of the lower duct front portion member 11 is placed on this frame portion 13*a* from above. Boss portions 13*b*, 13*b* which are formed at the bottom face portion 50*b* of the lower duct portion 5*e* of the body member and attachment piece portions 11*a*, 11*a* which are formed at the rear end of the eaves portion 50*h* of the lower duct front portion member 11 are overlapped longitudinally, and these overlapped portions are fixed with screws, not illustrated (see FIGS. 2 and 3). Attachment portions 13*c*, 13*c* which are formed at a front side portion of the frame portion 13*a* of the body member 13 and attachment piece portions 11*b*, 11*b* which are formed at a front end of the guide portion 50*i* of the lower duct front portion member 11 are fixed with screws.

Figure 10:
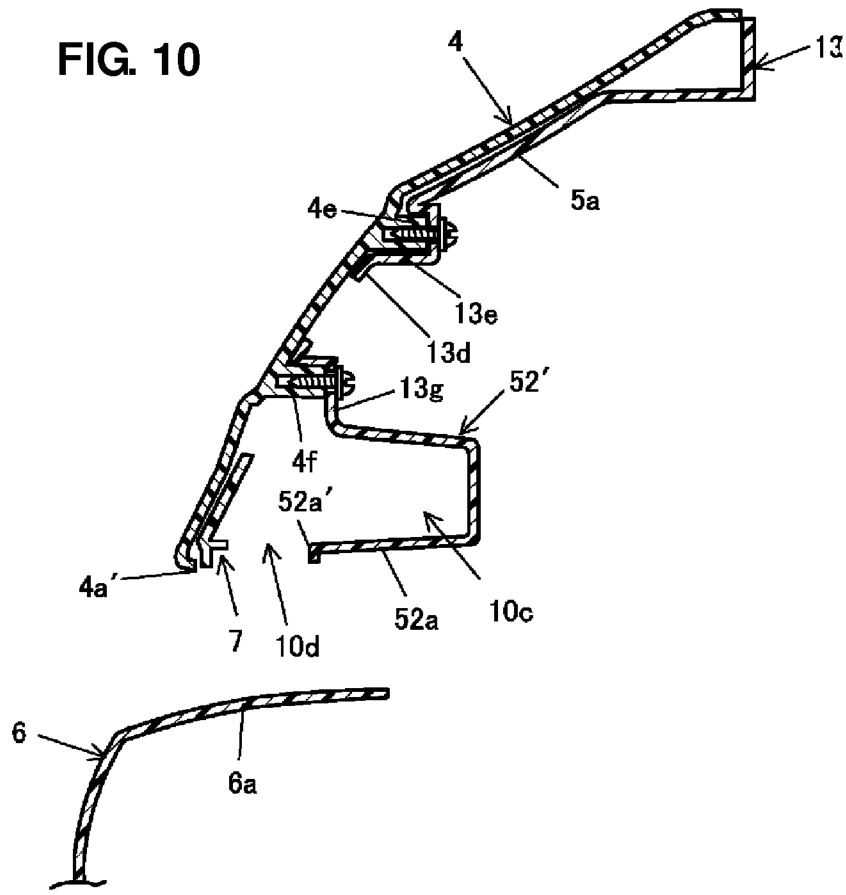
FIG. 10 is a sectional view (end face view) taken along line G-G of FIG. 3.

Further, as shown in FIG. 10, attachment portions 13*e*, 13*g* which are formed at a back face of an emblem portion 13*d* which is provided at a central portion of the fascia support face portion 5*a* of the body member 13 and boss portions 4*e*, 4*f* which are formed at a back face of the bumper fascia 4 are fixed with screws.

Figure 11:
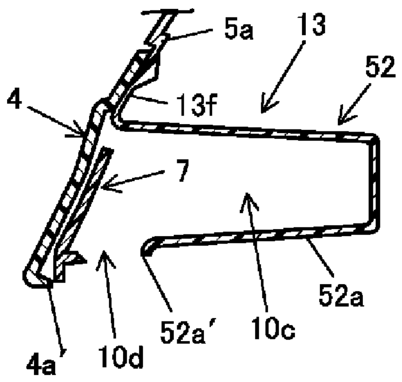
FIG. 11 is a sectional view (end face view) taken along line H-H of FIG. 3.

The fascia support face portion 5*a* of the body member 13 has a contact portion 13*f* to contact the central portion of the bumper fascia 4 as shown in FIG. 11.

Moreover, as shown in FIG. 6, a boss portion 70*d* which is formed at a rear end portion of the above-described projection wall portion 70*b* of the grill support member 7 and an attachment portion 13*e* (see FIG. 9) which is provided at the front side portion of the frame portion 13*a* of the body member 13 are fixed with screws.

Hereinafter, the function of the present embodiment will be described.

At first, the flow of the air which has come in through the air intake opening 4*a* of the bumper fascia 4 to the inlet Eni of the engine intake passage En will be described. A part of the air coming in through the air intake opening 4*a* at the bumper fascia 4 is guided to the inlet Eni of the intake passage En of the engine via the duct 10 which has the inlet portion 10*a* which is disposed so as to be exposed to the upper-side portion of the air intake opening 4*a* of the bumper fascia 4 and the outlet portion 10*b* of which connects to the inlet Eni of the intake passage En of the engine, as shown by the white arrows in FIGS. 3 through 5.

Thereby, even if the water coming in the vehicle front body through the air intake opening 4*a* rises up to the height of the inlet Eni of the engine intake passage En in the space behind the inlet portion 10*a* of the duct 10 and before the heat exchanger Ra, the water can be prevented from coming into the duct 10 as long as the water height on the flooded road is lower than that of the inlet portion 10*a* of the duct 10. Thus, the risk of the water coming into the inlet Eni of the intake passage En of the engine, thereby causing damage to the engine, can be reduced properly.

Further, the air intake opening 4*a* is formed so as to extend outward in the vehicle width direction beyond the heat exchanger Ra in the elevation view of the vehicle, and the inlet portion 10*a* of the duct 10 is disposed so as to be exposed to the portion of the air intake opening 4*a* which is positioned outside of the heat exchanger Ra. Thereby, the inlet portion 10*a* of the duct 10 does not exist in front of the heat exchanger Ra. Accordingly, even if the inlet portion 10*a* of the duct 10 is disposed so as to be exposed to the air intake opening 4*a*, the air introduction toward the heat exchanger Ra is not prevented.

Herein, the water height on the flooded road may change, so that a case in which the water height rises up above the inlet portion 10*a* of the duct 10 temporally should be anticipated. Further, if the water comes into the duct 10, the amount of air supplied to the engine may be reduced. Some countermeasures against this should be necessary as well.

According to the present embodiment, the inlet portion 10*a* of the duct 10 comprises two inlets which are disposed away from each other in the vehicle width direction, and there is provided the connection portion 10*c* which connects downstream portions of the inlets 10*a* and extends in the vehicle width direction at the positioned which is above the inlets 10*a* of the duct 10 and below the inlet Eni of the intake passage En of the engine. Thereby, an enlarged space is ensured by the connection portion 10*c* of the duct 10 which extends in the vehicle width direction at a middle level between the inlet portion 10*a* of the duct 10 and the inlet Eni of the engine intake passage En. Accordingly, even in case, as shown by dark arrows in FIGS. 3 and 4, the height of the water on the flooded road increases temporarily up above the inlet portion 10*a* of the duct 10 and consequently the water comes in through the inlet portion 10*a* of the duct 10, the water flows into the connection portion 10*c*, so that the duct 10 can be properly prevented from being filled with the water. As a result, the water coming into the duct 10 can be prevented properly from reaching the inlet Eni of the engine intake passage En, and the proper air flow to the inlet Eni of the engine can be ensured. Moreover, since the plural inlets 10*a* of the duct 10 are provided, even when the water comes in through one of the inlets 10*a*, the necessary amount of air for the engine can be effectively ensured. Further, since the eaves portion 50*h* is provided, the water coming in through the inlet portion 10*a* can be prevented properly from flowing to the downstream (upper) side of the eaves portion 50*h*, thereby preventing the water reaching the inlet Eni of the engine intake passage En more properly.

Figure 8:
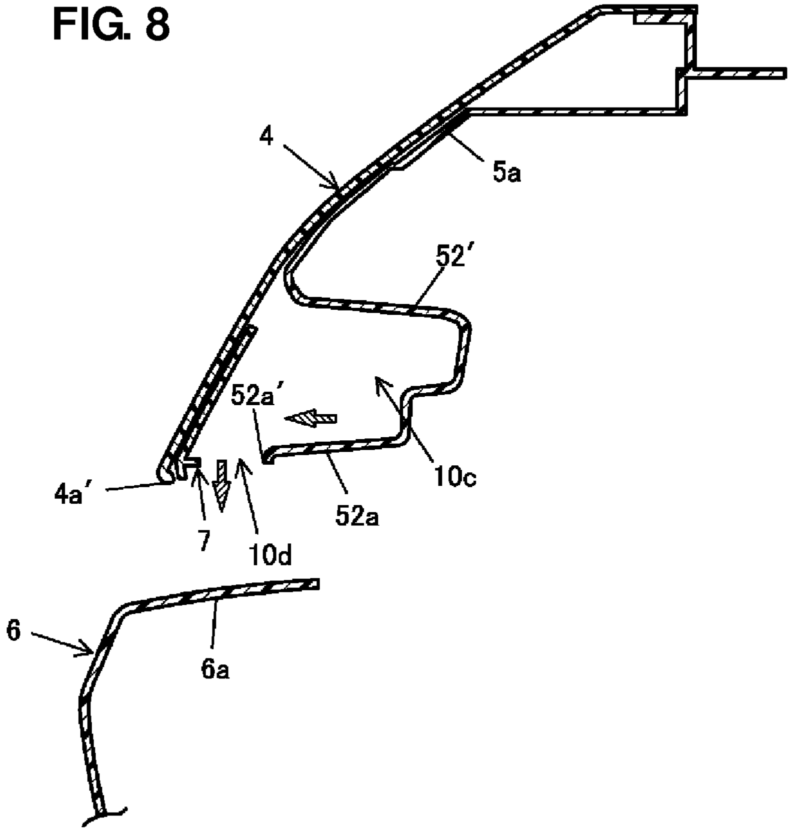
FIG. 8 is a sectional view (end face view) taken along line F-F of FIG. 3.

Moreover, since the drain portion 10*d* is provided at the connection portion 10*c* of the duct 10, the water coming into the duct 10 through the inlet portion 10*a* is discharged from the drain portion 10*d* as shown by dark arrows in FIGS. 3 and 8 even in the case the water comes into the duct 10. Accordingly, preventing the water from reaching the inlet Eni of the engine intake duct En can be improved.

Further, since the duct 10 includes the bumper fascia 4, the duct 10 can be formed properly by using a member which is generally provided at the automotive vehicle. Also, since the duct 10 includes the fascia support member 5 which is provided so as to face to the back face of the bumper fascia 4, the duct 10 can be provided along with the bumper fascia 4 having its increased rigidity.

The following function and advantage may be also obtained when the vehicle travels on rainy days, even not on the flooded road, according to the present embodiment.

Since there is provided the eaves portion 50*h* extending substantially horizontally, the rainwater which has come in from the air intake opening 4*a* via the inlet portion 10*a* as shown by the dark arrows in FIGS. 3 and 4 when the vehicle travels on the rainy days or the like is trapped at the lower face of the eaves portion 50*h* and drops. Thus, the rainwater can be prevented from coming down to the downstream (upward) of the eaves portion 50*h*.

Further, the guide portions 50*i* are provided at the right and left eaves portions 50*h*, and the guide connection portion 52 to drain the water is provided so as to extend in the vehicle width direction between these both guide portions 50*i*, 50*i* and connect these portions. Thus, the rainwater which has dropped from the eaves portion 50*h* is guided to the guide connection portion 52 at the central portion, and then is drained to the outside from the drain portion 10*c* of the guide connection portion 52.

The following advantage may be also obtained at the vehicle frontal collision or the like according to the present embodiment. That is, an impact load acts on the bumper 2 of the vehicle 1 from the font obliquely at the vehicle frontal collision or the like, and this impact load is inputted to the bumper-fascia support member 5 via the low-rigidity bumper fascia 4. Herein, since the lower duct front portion members 11, 11 on the both sides of the bumper-fascia support member 5 are made of the low-rigidity member, the members 11, 11 may be broken properly, thereby absorbing the impact load effectively.

Herein, the rigidity of the bumper-fascia support member 5 generally tends to increase with the duct 10 having a structure comprising walls, so that there is a concern that the impact load would not be absorbed properly. According to the present invention, however, the lower duct front portion members 11, 11 are made of the low-rigidity member. Thus, the absorption of the impact load can be conducted properly even if the duct 10 is formed. Further, the breakage of the lower duct front portion members 11, 11 which constitute the front portion of the lower duct portion 5*e* may properly prevent the body member 13 of the bumper-fascia support member 5 from being broken. The breakage of the shroud member 3, which is disposed behind the bumper-fascia support member 5 and the opening portion 3*b* of which the duct connects to, may be also conducted.

The body member 13 has a sufficient rigidity, so an improper deformation of the bumper fascia 4 can be prevented in its normal condition.

Embodiment 2

Figure 12:
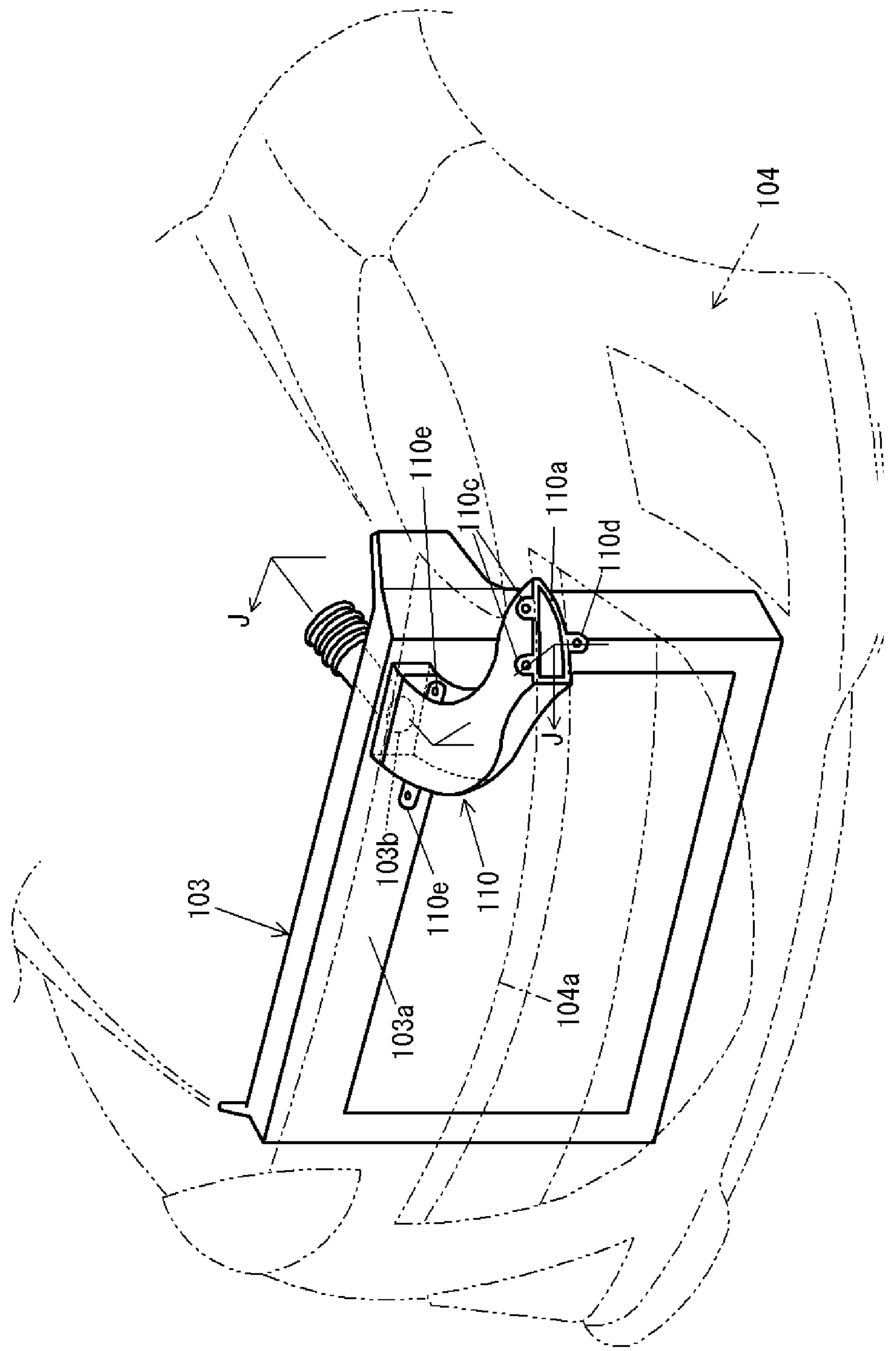
FIG. 12 is a perspective view of a front portion of an automotive vehicle according to a second embodiment of the present invention.

According to a second embodiment, as shown in FIG. 12, a duct 110 is made of a particular member which interconnects an upper-portion side of an opening 104*a* of a bumper fascia 104 and an opening portion 103*b* of an upper side portion 103*a* of a shroud member 103.

Figure 13:
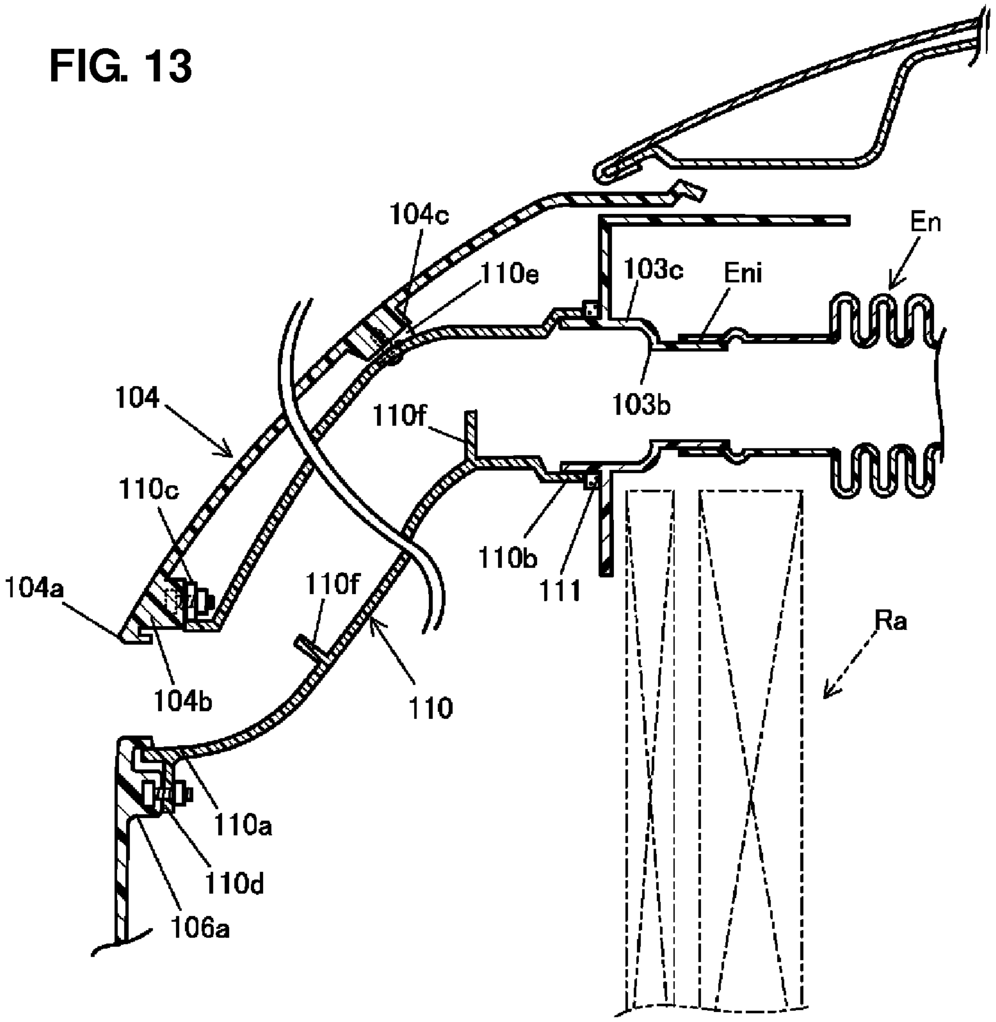
FIG. 13 is a sectional view (end face view) taken along line J-J of FIG. 12.

The duct 110 has, as shown in FIG. 13 as well, fixing piece portions 110*c*, 110*c*, 110*d*, 110*e*, 110*e* to a back face of the bumper fascia 104 at its front end portion and middle portion. The fixing piece portions 110*c*, 110*c* of the upper front end of the duct 110 are fixed to a boss 104*b* which is formed at a back face of an upper edge portion of the opening 104*a* of the bumper fascia 104 with screws. The fixing piece portion 110*d* of the lower front end of the duct 110 is fixed to a boss 106*a* which is formed at a back face of an upper edge portion of the grill member 106 with screws. The fixing piece portions 110*e*, 110*e* of the middle portion of the duct 110 are fixed to a boss 104*c* which is formed at a back face of a specified portion of the bumper fascia 104 which is located above the opening 104*a* with screws.

Figure 14:
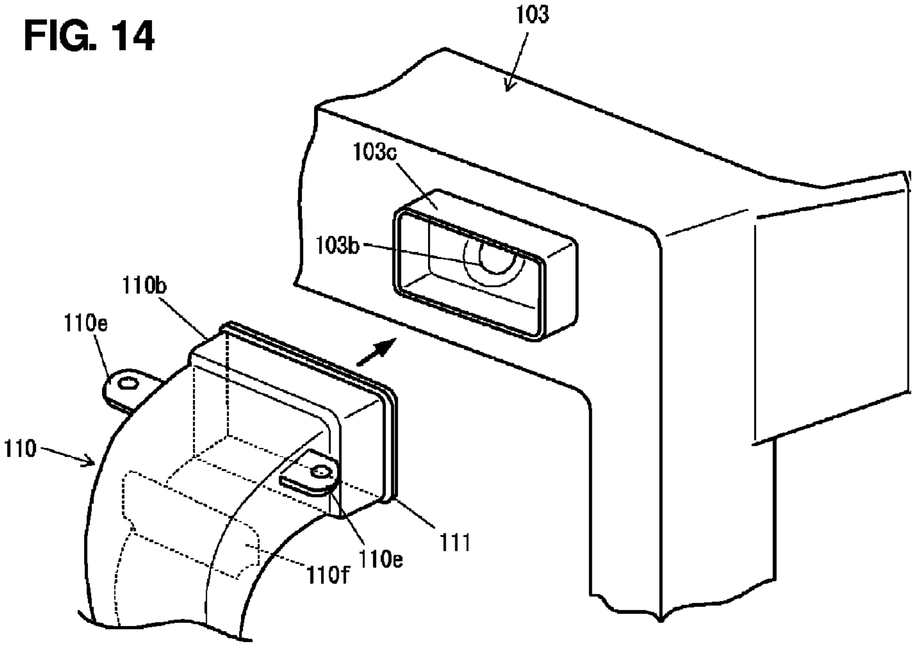
FIG. 14 is a perspective view of a duct and a shroud member, which are separated from each other at a connection portion.
Figure 15:
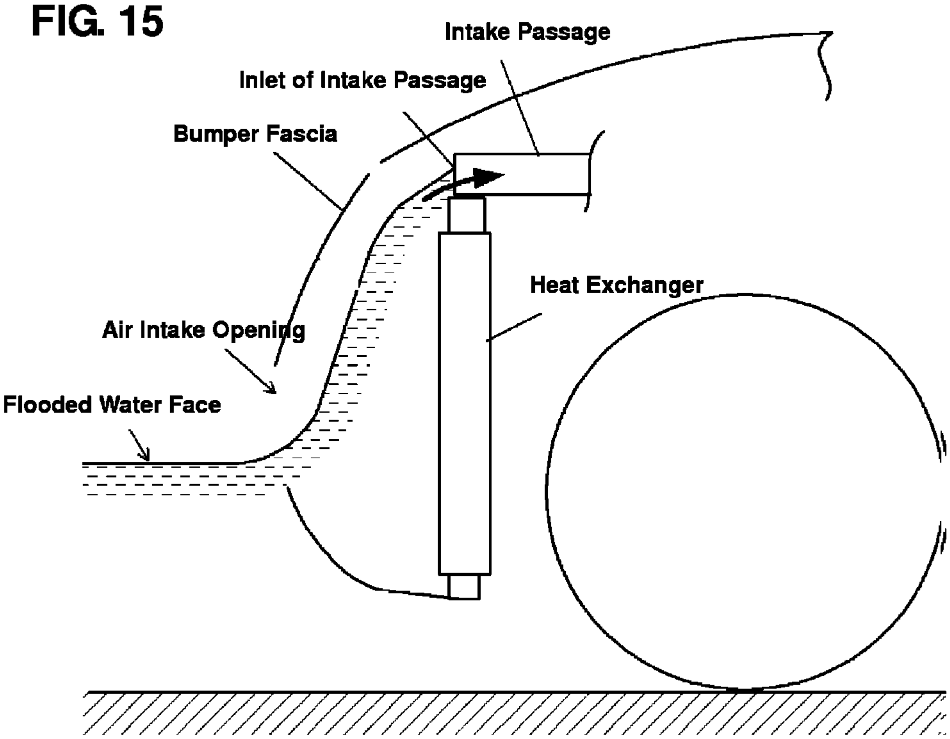
FIG. 15 is a diagram explaining a problem to be solved.

Further, as shown in FIG. 14, a cylindrical penetration portion 103*c* is formed at the upper side portion 103*a* of the shroud member 103, and an outlet portion 110*b* of the duct 110 is connected to the front side of the penetration portion 103*c*, while the inlet Eni of the engine intake passage En is connected to the rear side of the penetration portion 103*c*. Thus, the outlet portion 110*b* of the duct 110 connects to the inlet Eni of the intake passage En via the penetration portion 103*c*. Herein, the inner diameter of the outlet portion 110*b* of the duct 110 is set to be slightly greater than the outer diameter of the penetration portion 103*c*, considering the forming accuracy or the like. Consequently, since there is a concern that the heat of the radiator Ra would come in through its gap, there is provided a sponge member 111 to prevent this at a rear end portion of the outlet portion 110*b* of the duct 110.

Further, water shutout portions 110*f*, 110*f* which can prevent the water coming in through the inlet portion 110*a* from reaching the outlet portion 110*b* are provided at two positions in the duct 110 near the inlet portion 110*a* and the outlet portion 110*b* respectively.

According to the second embodiment, like the first embodiment, a part of the air coming in through the air intake opening 104*a* at the bumper fascia 104 is guided to the inlet Eni of the intake passage En of the engine via the duct 110 which has the inlet portion 110*a* which is disposed so as to be exposed to the upper-side portion of the air intake opening 104*a* of the bumper fascia 104 and the outlet portion 110*b* of which connects to the inlet Eni of the intake passage En of the engine.

Thereby, even if the water coming in the vehicle front body through the air intake opening 104*a* rises up to the height of the inlet Eni of the engine intake passage En in the space behind the inlet portion 110*a* of the duct 110 and before the heat exchanger Ra, the water can be prevented from coming into the duct 110 as long as the water height on the flooded road is lower than that of the inlet portion 110*a* of the duct 110. Thus, the risk of the water coming into the inlet Eni of the intake passage En of the engine, thereby causing damage to the engine, can be reduced properly.

Moreover, according to the second embodiment, the above-described advantages can be obtained by adding the duct with a simple structure even in a case in which the fascia support member like the first embodiment is not provided, or a fascia support member having a different structure.

The present invention should not be limited to the above-described embodiments, and any other modifications and improvements may be applied within the scope of a spirit of the present invention.

What is claimed is:

1. An engine intake passage structure of a front vehicle body, comprising:

an intake passage of an engine, an inlet of which is disposed above a heat exchanger which is provided at a front portion of a vehicle body;

an air intake opening to introduce outside air therein, the air intake opening being formed at a specified portion of a bumper fascia which forms an outer face of the front portion of the vehicle body, the specified portion facing to the heat exchanger; and a duct to guide the outside air, an inlet portion of which is disposed so as to be exposed to an upper-side portion of the air intake opening and an outlet portion of which connects to the inlet of the intake passage of the engine, wherein said duct includes a crank-shaped bending portion where the outside air introduced therein from the inlet portion thereof is guided upward and then rearward toward the outlet portion thereof in a side view of the vehicle body, and an eaves portion is provided at a corner portion of the crank-shaped bending portion such that the eaves portion projects forward from the corner portion so as to trap water coming in from the inlet portion of the duct therewith and make the water drop therefrom.

2. The engine intake passage structure of a front vehicle body of claim 1, wherein said air intake opening is formed so as to extend outward in a vehicle width direction beyond the heat exchanger in an elevation view of a vehicle, and said inlet portion of the duct is disposed so as to be exposed to a portion of the air intake opening which is positioned outside of the heat exchanger.

3. The engine intake passage structure of a front vehicle body of claim 1, wherein said inlet portion of the duct comprises a plurality of inlets which are disposed away from each other in a vehicle width direction, and there is provided a connection portion which connects downstream portions of the plural inlets and extends in the vehicle width direction at a positioned which is above the inlets of the duct and below said inlet of the intake passage of the engine.

4. The engine intake passage structure of a front vehicle body of claim 3, wherein a drain portion is provided at said connection portion of the duct.

5. The engine intake passage structure of a front vehicle body of claim 1, wherein said duct includes the bumper fascia and a member which is provided so as to face to a back face of the bumper fascia.

6. The engine intake passage structure of a front vehicle body of claim 1, wherein said duct comprises a bumper fascia and a bumper-fascia support member, the bumper-fascia support member including a lower duct portion which comprises a bottom face portion which is provided substantially continuously to the inlet portion of the duct and a rear face portion which rises upward from a rear end of the bottom face portion, the a bottom face portion and the rear face portion constituting said crank-shaped bending portion where the outside air introduced therein is guided upward and then rearward toward the outlet portion thereof, and said eaves portion projects forward substantially horizontally from an upper end of the rear face portion.

7. An engine intake passage structure of a front vehicle body, comprising:

an intake passage of an engine, an inlet of which is disposed above a heat exchanger which is provided at a front portion of a vehicle body;

an air intake opening to introduce outside air therein, the air intake opening being formed at a specified portion of a bumper fascia which forms an outer face of the front portion of the vehicle body, the specified portion facing to the heat exchanger; and a duct to guide the outside air, an inlet portion of which is disposed so as to be exposed to an upper-side portion of the air intake opening and an outlet portion of which connects to the inlet of the intake passage of the engine, wherein said duct includes a crank-shaped bending portion where the outside air introduced therein from the inlet portion thereof is guided upward and then rearward toward the outlet portion thereof in a side view of the vehicle body, and an eaves portion is provided at a corner portion of the crank-shaped bending portion such that the eaves portion projects forward from the corner portion so as to trap water coming in from the inlet portion of the duct therewith and make the water drop therefrom, said air intake opening is formed so as to extend outward in a vehicle width direction beyond the heat exchanger in an elevation view of a vehicle, and said inlet portion of the duct is disposed so as to be exposed to a portion of the air intake opening which is positioned outside of the heat exchanger, said inlet portion of the duct comprises a plurality of inlets which are disposed away from each other in a vehicle width direction, and there is provided a connection portion which connects downstream portions of the plural inlets and extends in the vehicle width direction at a positioned which is above the inlets of the duct and below said inlet of the intake passage of the engine.

8. The engine intake passage structure of a front vehicle body of claim 7, wherein a drain portion is provided at said connection portion of the duct.

9. The engine intake passage structure of a front vehicle body of claim 8, wherein said duct includes the bumper fascia and a member which is provided so as to face to a back face of the bumper fascia.

* * * * *